US012809794B2

(12) United States Patent
Mayer et al.

(10) Patent No.: US 12,809,794 B2
(45) Date of Patent: Nov. 24, 2026

(54) PUSH-PULL MECHANISMS FOR HANDLING DATAFLOW BETWEEN CIRCUIT BLOCKS

(71) Applicant: Analog Devices, Inc., Wilmington, MA (US)

(72) Inventors: Christopher Mayer, Dover, MA (US); Sudhir Desai, Mansfield, MA (US); Arash Azizimazreah, Merrimack, NH (US)

(73) Assignee: ANALOG DEVICES, INC., Wilmington, MA (US)

( * ) Notice: Subject to any disclaimer, the term of this patent is extended or adjusted under 35 U.S.C. 154(b) by 0 days.

(21) Appl. No.: 18/952,387

(22) Filed: Nov. 19, 2024

(65) Prior Publication Data

US 2025/0181530 A1 Jun. 5, 2025

Related U.S. Application Data

(60) Provisional application No. 63/604,426, filed on Nov. 30, 2023.

(51) Int. Cl.
*G06F 13/16* (2006.01)
*G06F 11/34* (2006.01)
(Continued)

(52) U.S. Cl.
CPC ........ *G06F 13/1673* (2013.01); *G06F 12/023* (2013.01); *G06F 11/3433* (2013.01)

(58) Field of Classification Search
CPC .............................. G06F 13/4027; H04B 1/04
See application file for complete search history.

(56) References Cited

U.S. PATENT DOCUMENTS

| | | | |
|---|---|---|---|
| 5,650,993 | A | 7/1997 | Lakshman et al. |
| 6,084,856 | A | 7/2000 | Simmons et al. |

(Continued)

FOREIGN PATENT DOCUMENTS

| | | | |
|---|---|---|---|
| CN | 101620585 | A | 1/2010 |
| CN | 113626353 | A | 11/2021 |

(Continued)

OTHER PUBLICATIONS

Office Action with Translation issued in Taiwanese Patent Application No. 113145442 dated Sep. 10, 2025 in 16 pages.

(Continued)

*Primary Examiner* — Getente A Yimer
(74) *Attorney, Agent, or Firm* — Knobbe, Martens, Olson & Bear, LLP

(57) ABSTRACT

Push-pull mechanisms for handling dataflow between circuit blocks are disclosed. In certain embodiments, a network of dataflow gaskets includes a source gasket coupled to a first circuit block and a destination gasket coupled to a second circuit block. The source gasket and the destination gasket are connected by a push mechanism that uses write channels to write data from the source gasket to the destination gasket, and a pull mechanism that uses read channels to read data from the source gasket to the destination gasket. The source gasket and the destination gasket can switch between a push mode and a pull mode to ease traffic based on data available to transfer at the source gasket and/or a space available to receive data in the destination gasket. For example, a transfer size register can be used to set a threshold to aid between the mode transitions.

20 Claims, 15 Drawing Sheets

Dataflow Gasket

(51) Int. Cl.

| | |
|---|---|
| ***G06F 12/02*** | (2006.01) |
| ***G06F 13/40*** | (2006.01) |
| ***G06F 15/173*** | (2006.01) |
| ***G06F 15/82*** | (2006.01) |
| ***G06N 3/0464*** | (2023.01) |
| ***G06N 3/063*** | (2023.01) |

(56) References Cited

U.S. PATENT DOCUMENTS

| | | | |
|---|---|---|---|
| 6,195,593 | B1 | 2/2001 | Nguyen |
| 6,678,722 | B1 | 1/2004 | Kanoh |
| 7,058,728 | B1 | 6/2006 | Eklund |
| 10,678,724 | B1 * | 6/2020 | ChoFleming ........... H04L 67/60 |
| 12,530,308 | B2 | 1/2026 | Mayer et al. |
| 2004/0179476 | A1 | 9/2004 | Kim et al. |
| 2005/0270976 | A1 | 12/2005 | Yang et al. |
| 2006/0206635 | A1 | 9/2006 | Alexander et al. |
| 2012/0185614 | A1 | 7/2012 | Reed |
| 2014/0173161 | A1 | 6/2014 | Dobbs et al. |
| 2014/0211634 | A1 | 7/2014 | Matthews et al. |
| 2014/0369194 | A1 | 12/2014 | Friedman et al. |
| 2017/0171095 | A1 | 6/2017 | Prasadh et al. |
| 2019/0102338 | A1 * | 4/2019 | Tang ................... G06F 9/30038 |
| 2019/0392020 | A1 | 12/2019 | Balasubramaniyan et al. |
| 2020/0004538 | A1 * | 1/2020 | Fleming, Jr. .......... G06F 15/825 |
| 2021/0011533 | A1 * | 1/2021 | Escamilla .............. G05B 15/02 |
| 2021/0318982 | A1 | 10/2021 | Wei et al. |
| 2022/0035760 | A1 | 2/2022 | Lin et al. |
| 2022/0100680 | A1 * | 3/2022 | Chrysos .............. G06F 13/4027 |
| 2023/0090431 | A1 * | 3/2023 | Banin ...................... H04B 1/04 375/295 |
| 2023/0135306 | A1 | 5/2023 | Di Febbo et al. |
| 2025/0036587 | A1 | 1/2025 | Mayer et al. |
| 2025/0036842 | A1 | 1/2025 | Mayer et al. |

FOREIGN PATENT DOCUMENTS

| | | | |
|---|---|---|---|
| EP | 3 346 423 | A1 | 7/2018 |
| JP | 2017-130930 | A | 7/2017 |
| TW | 201234293 | A | 8/2012 |
| TW | I528279 | B | 4/2016 |
| WO | WO 2007/020274 | A2 | 2/2007 |

OTHER PUBLICATIONS

International Search Report and Written Opinion for International Application No. PCT/US2024/055561 dated Jan. 24, 2025, in 12 pages.

Second Office Action issued in Taiwanese Patent Application No. 113145442 dated Jun. 23, 2026 in 10 pages.

Notice of Allowance issued in Taiwanese Patent Application No. 113145442 dated Aug. 28, 2026 in 3 pages.

* cited by examiner

Dataflow Gasket

Data_High_Flag= (Data Available > Threshold + Margin) Space_Low_Flag= (Space Available <=Threshold + Margin)

Data_Low_Flag= (Data Available <= Threshold + Margin) Space_High_Flag= (Space Available > 2*Threshold + Margin)

PUSH-PULL MECHANISMS FOR HANDLING DATAFLOW BETWEEN CIRCUIT BLOCKS

CROSS-REFERENCE TO RELATED APPLICATIONS

The present application claims priority to U.S. Provisional Patent Application No. 63/604,426, filed Nov. 30, 2023, and titled "PUSH-PULL MECHANISMS FOR HANDLING DATAFLOW BETWEEN CIRCUIT BLOCKS," the entirety of which is hereby incorporated herein by reference.

FIELD OF THE DISCLOSURE

Embodiments of the invention relate to electronic systems, and more particularly to, push-pull mechanisms for handling dataflow between circuit blocks.

BACKGROUND

Various techniques can be used to move data between electronic circuits. For example, certain electronic systems use standard bussing for interconnecting circuit blocks for data movement. However, data traffic can be of many types (memory, peripheral, and/or computation) having varying characteristics. Thus, when standard bussing is designed for overall throughput, the bussing can stall at times while slower systems (i.e. off-chip memory) absorb high traffic periods.

In another example, point-to-point bussing can be used to connect each compute block to every other compute block. Point-to-point bussing can support any arbitrary data traffic between circuit blocks but can have unnecessary area and/or power overhead.

SUMMARY OF THE DISCLOSURE

Push-pull mechanisms for handling dataflow between circuit blocks are disclosed. In certain embodiments, a network of dataflow gaskets includes a source gasket coupled to a first circuit block and a destination gasket coupled to a second circuit block. The source gasket and the destination gasket are connected by a push mechanism that uses write channels to write data from the source gasket to the destination gasket, and a pull mechanism that uses read channels to read data from the source gasket to the destination gasket. The source gasket and the destination gasket can switch between a push mode and a pull mode to ease traffic based on data available to transfer at the source gasket and/or a space available to receive data in the destination gasket. For example, a transfer size register can be used to set a threshold to aid between the mode transitions.

In one aspect, an integrated circuit (IC) includes a plurality of circuit blocks including a first circuit block and a second circuit block. The IC further includes a plurality of dataflow gaskets electrically connected by a network of gasket interconnect, the plurality of dataflow gaskets including a source gasket comprising an output memory coupled to the first circuit block, and a destination gasket comprising an input memory coupled to the second circuit block. The source gasket is configured to communicate with the destination gasket over the network using a push mode and a pull mode. A transition from the pull mode to the push mode occurs in response to a data low trigger signal activated by the source gasket and a space high qualifier signal activated by the destination gasket. Additionally, a transition from the push mode to the pull mode occurs in response to a space low trigger signal activated by the destination gasket and a data high qualifier signal activated by the source gasket.

In another aspect, a method of handling dataflow between circuit blocks is disclosed. The method includes communicating between a source gasket and a destination gasket over a network using a push mode and a pull mode, the source gasket including an output memory coupled to a first circuit block and the destination gasket including an input memory coupled to a second circuit block. The method further includes providing a transition from the pull mode to the push mode in response to a data low trigger signal activated by the source gasket and a space high qualifier signal activated by the destination gasket. The method further includes providing a transition from the push mode to the pull mode in response to a space low trigger signal activated by the destination gasket and a data high qualifier signal activated by the source gasket.

DETAILED DESCRIPTION

Figure 1:
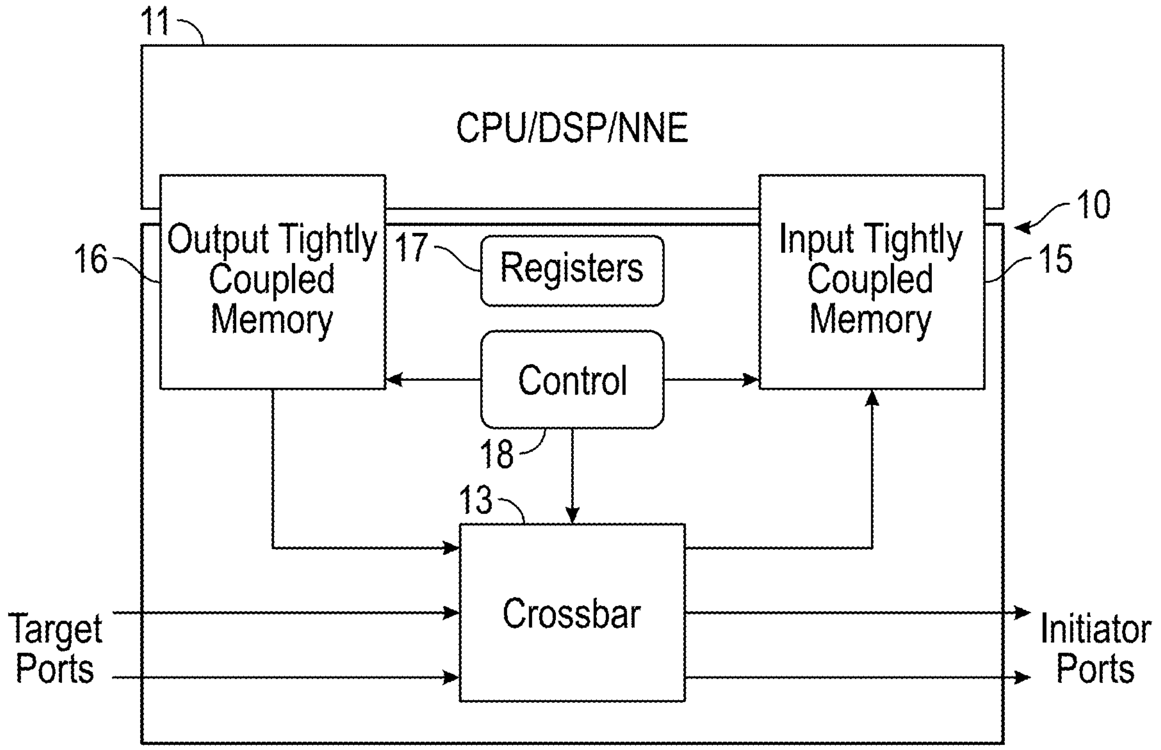
FIG. 1 is a schematic diagram of one embodiment of a dataflow gasket.

The following detailed description of embodiments presents various descriptions of specific embodiments of the invention. However, the invention can be embodied in a multitude of different ways. In this description, reference is made to the drawings where like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

As integrated circuit (IC) technology is scaled to smaller technology nodes, the transistor density (or number of transistors that can be integrated into a unit area of an IC) increases drastically. The increased density translates to heterogeneous complex chips in which multiple blocks with different architectures are combined into a single die to provide a System-on-Chip (SoC). For example, a single die can include a combination of central processing units (CPUs), digital signal processors (DSPs), and neural processing units (NPUs). A NPU is also referred to herein as a neural network engine (NNE).

On the other hand, in the past few years, neural networks such as convolution neural networks (CNNs), recurrent neural networks (RNNs), and multi-layer perception networks (MLPs) have been shown to outperform traditional DSP algorithms in many fields such as computer vision and speech recognition.

Accordingly, many current and future IC applications consist of DSP algorithms and neural network models. In these applications, while fast data converters (for example, high-speed analog-to-digital converters (ADCs)) provide the data for processing, different parts of computational graphs are mapped onto different circuit blocks such as CPUs, DSPs, and NPUs. Such mapping gives rise to significant data movement among different circuit blocks. Thus, data transfer between circuit blocks is key to achieving fast and efficient processing for these signal processing applications.

Certain ICs use standard bussing to build a network-on-chip (NoC) for interconnecting circuit blocks for data movement. However, a standard NOC has many types of traffic (memory, peripheral, and/or computation) having varying characteristics. Standard bussing is typically designed for overall throughput, and thus can stall at times while slower systems (i.e. off-chip memory) absorb high traffic periods.

In another example, point-to-point bussing can be used to connect each compute block to every other compute block. Point-to-point bussing can support any arbitrary data traffic between circuit blocks. However, in many domain-specific applications such as signal processing, only a handful of traffic patterns are generated during run time. Accordingly, such generality is not needed, but rather causes an inefficient usage of resources (transistors and wires) and leads to unnecessary area and/or power overhead. For example, point-to-point bussing is not scalable and requires exponentially more wires as the number of compute blocks increases.

The dataflow gaskets disclosed herein can be deployed in any number or arrangement to achieve efficient on-chip data movement among different circuit blocks of the die. Each dataflow gasket is attached to a corresponding circuit block using tightly coupled memories to provide low latency and fast access to incoming and outgoing data streams. Furthermore, memory allocation and buffer management are handled by the internal logic in the dataflow gasket to reduce or eliminate software development efforts.

In certain embodiments, an IC includes a network of dataflow gaskets including a source gasket coupled to a first circuit block and a destination gasket coupled to a second circuit block. The source gasket and the destination gasket are connected by a push mechanism that uses write channels to write data from the source gasket to the destination gasket, and a pull mechanism that uses read channels to read data from the source gasket to the destination gasket. The source gasket and the destination gasket can switch between a push mode and a pull mode to ease traffic based on data available to transfer at the source gasket and/or a space available to receive data in the destination gasket. For example, a transfer size register can be used to set a threshold (also referred to herein as a watermark) to aid between the mode transitions.

By using dataflow gaskets in this manner, fast and efficient transfer of data is achieved without the first circuit block and the second circuit block needing to directly communicate with one another and/or understand each other's internal memory addressing. Furthermore, the data can be transferred between the source gasket and the destination gasket without stalling the interface.

The write channels and read channels can be implemented by conductors associated with the interconnect of gasket network. Thus, the source gasket and destination gasket can be either directly connected to one another or indirectly connected through one or more intervening gaskets.

The dataflow gaskets have networking capabilities in which dataflow gaskets can be networked using fast internal interconnects. The internal interconnect topology is customizable based on the traffic patterns that exist in the computational graph of a particular signal processing application. Accordingly, an efficient usage of resources used for interconnects is provided. Furthermore, the dataflow gaskets can be integrated into an IC alongside of traditional NoCs in different configurations. Thus, the IC can include a network of dataflow gaskets alongside other levels of bussing providing varying performance levels, such as different degrees of connectivity, throughput and/or latency.

FIG. 1 is a schematic diagram of one embodiment of a dataflow gasket 10. The dataflow gasket 10 is depicted as being coupled to a circuit block 11, which can be, for example, a CPU, DSP, NNE, reconfigurable compute unit (for example, a field programmable gate array (FPGA)), or other intellectual property (IP) circuit block. The dataflow gasket 10 includes a crossbar switch 13, an input memory 15, an output memory 16, registers 17, and a control circuit 18. The dataflow gasket 10 can be interconnected with other dataflow gasket(s) on-chip as part of a larger NoC. Thus, dataflow gaskets can be arranged on an IC to form a desired NoC suitable for a particular IC design or application. An IC is also referred to herein as a semiconductor die or chip.

In the illustrated embodiment, the crossbar switch 13 includes an input-side that is coupled to input ports (also referred to herein as target ports) and to the output memory 16. The input ports receive data packets from a network of dataflow gaskets. The crossbar switch 13 also includes an output-side that is coupled to output ports (also referred to herein as initiator ports) and to the input memory 15. The output ports provide data packets to other dataflow gasket(s) in the network. The crossbar switch 13 is controlled by the control circuit 18 to provide desired switch connectivity between the input side and the output side.

Accordingly, the crossbar switch 13 can provide desired connections between the input side and the output side to thereby route data into and out of the dataflow gasket 10. In a first example, data received on the input ports is routed by the crossbar switch 13 to the input memory 15. In a second example, data received on the input ports is routed by the crossbar switch 13 to the output ports. In a third example, data from the output memory 16 is routed by the crossbar switch 13 to the output ports.

With continuing reference to FIG. 1, the registers 17 (also referred to herein as a register file) are used to hold a variety of information, including, for example, gasket identification information for identifying the gasket within the network of dataflow gaskets, a routing table, input stream configuration for input stream(s), output stream configuration for output stream(s), and/or feature configuration data for controlling a variety of gasket features.

The input memory 15 receives data from the crossbar switch 13, and is tightly coupled to the circuit block 11. Additionally, the output memory 16 provides data to the crossbar switch 13 and is tightly coupled to the circuit block 11. Both the circuit block 11 and the dataflow gasket 10 have access to the input memory 15 and the output memory 16. In one example, the dataflow gasket 10 can write to the input memory 15 and read from the output memory 16, while the circuit block 11 can read from the input memory 15 and write to the output memory 16. However, other implementations are possible, such as configurations in which both the dataflow gasket 10 and the circuit block 11 can read and write to both the input memory 15 and the output memory 16.

In certain implementations, the input memory 15 and/or the output memory 16 are implemented with a circular buffer to facilitate memory allocation and dataflow. By using circular buffer(s), complexity in reading and writing over the memory interface between the circuit block 11 and the dataflow gasket 10 is reduced. Accordingly, during design of an IC, a desired architecture of circuit blocks (CPUs, DSPs, NNEs, reconfigurable compute units, and/or other IP blocks) can be placed and easily interconnected to one another by a network of dataflow gaskets with little to no design overhead.

Figure 2A:
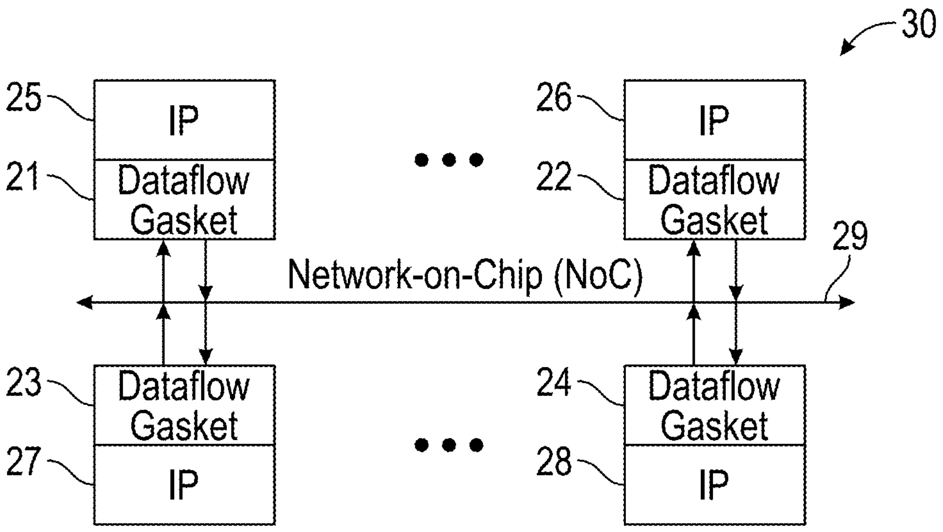
FIG. 2A is a schematic diagram of one embodiment of an integrated circuit (IC) including circuit blocks interconnected by dataflow gaskets.

FIG. 2A is a schematic diagram of a one embodiment of an IC 30 including circuit blocks interconnected by dataflow gaskets.

In the illustrated embodiment, the IC 30 includes a first dataflow gasket 21, a second dataflow gasket 22, a third dataflow gasket 23, a fourth dataflow gasket 24, a first circuit block 25, a second circuit block 26, a third circuit block 27, a fourth circuit block 28, and interconnect forming an NoC 29. Although four dataflow gaskets and four circuit blocks are depicted, more or fewer gaskets and circuit blocks can be included as indicated by the ellipsis.

As shown in FIG. 2A, the NoC 29 interconnects the dataflow gaskets 21-24 to one another. Additionally, the dataflow gaskets 21-24 are connected to the circuit blocks 25-28, respectively. The dataflow gaskets 21-24 and NoC 29 allow the efficient transfer of data between the depicted circuit blocks 25-28.

Although one arrangement of dataflow gaskets is shown, dataflow gaskets can be connected in a wide variety of ways. Indeed, dataflow gaskets serve as building blocks for data flow that allow for implementing the NoC 29 to achieve standard topologies such as mesh and ring as well as any custom topology.

Figure 2B:
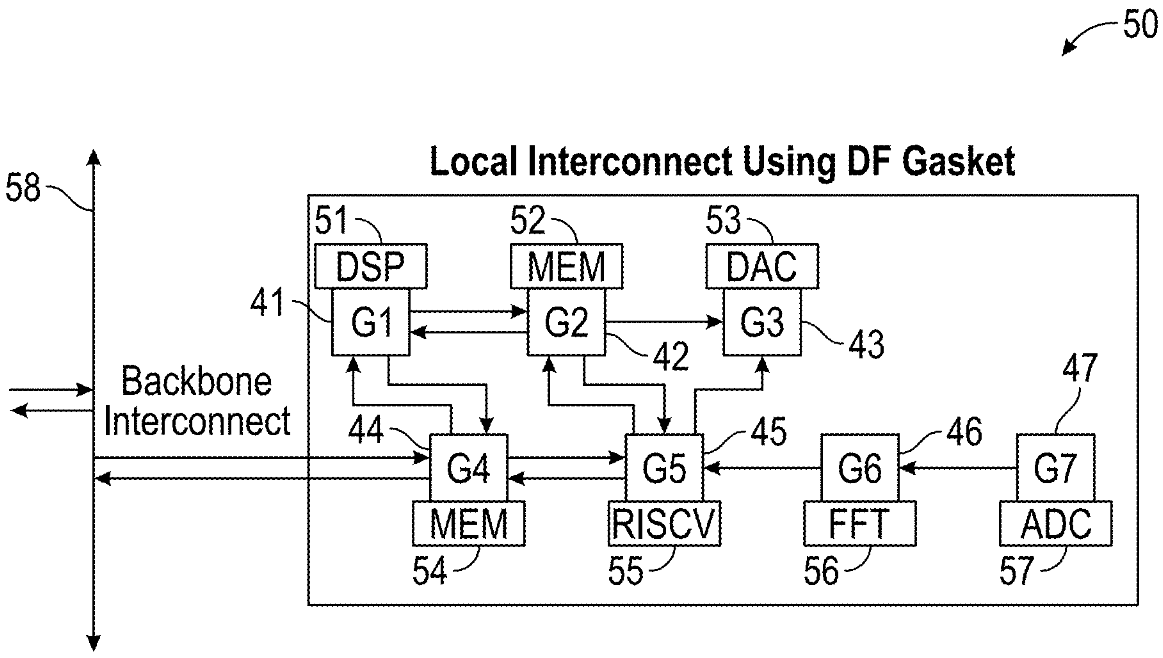
FIG. 2B is a schematic diagram of another embodiment of an IC including circuit blocks interconnected by dataflow gaskets.

FIG. 2B is a schematic diagram of another embodiment of an IC 50 including circuit blocks interconnected by dataflow gaskets.

In the illustrated embodiment, the IC 50 includes dataflow gaskets 41, 42, 43, 44, 45, 46, and 47 (collectively dataflow gaskets 41-47) that are interconnected with one another using an example custom interconnect topology. As shown in FIG. 2B by the directional arrows, a particular gasket can communicate with a subset of the other gasket(s). Such communication can be unidirectional (read or write only) or bidirectional (read and write).

The gaskets 41-47 are each connected to a particular circuit block, which are of varying types of IP blocks, in this embodiment. In particular, the IC 50 includes a DSP 51 coupled to the dataflow gasket 41, a memory 52 coupled to the dataflow gasket 42, a digital-to-analog converter (DAC) 53 coupled to the dataflow gasket 43, a memory 54 coupled to the dataflow gasket 44, a fifth generation reduced instruction set computer (RISCV or RISC-V) 55 coupled to the dataflow gasket 45, a fast Fourier transform (FFT) processor 56 coupled to the dataflow gasket 46, and an ADC 57 coupled to the dataflow gasket 47.

The IC 50 depicts one example application that can benefit from the use of dataflow gaskets to provide efficient transfer of data between various circuit blocks. Although one example topology is shown, dataflow gaskets can be deployed in a wide variety of standard, semi-custom, or custom topologies to facilitate dataflow between any desired circuit blocks. Such dataflow can be further expanded by connection of one or more of the dataflow gaskets to backbone interconnect 58, thereby allowing connectivity to further components.

Figure 3:
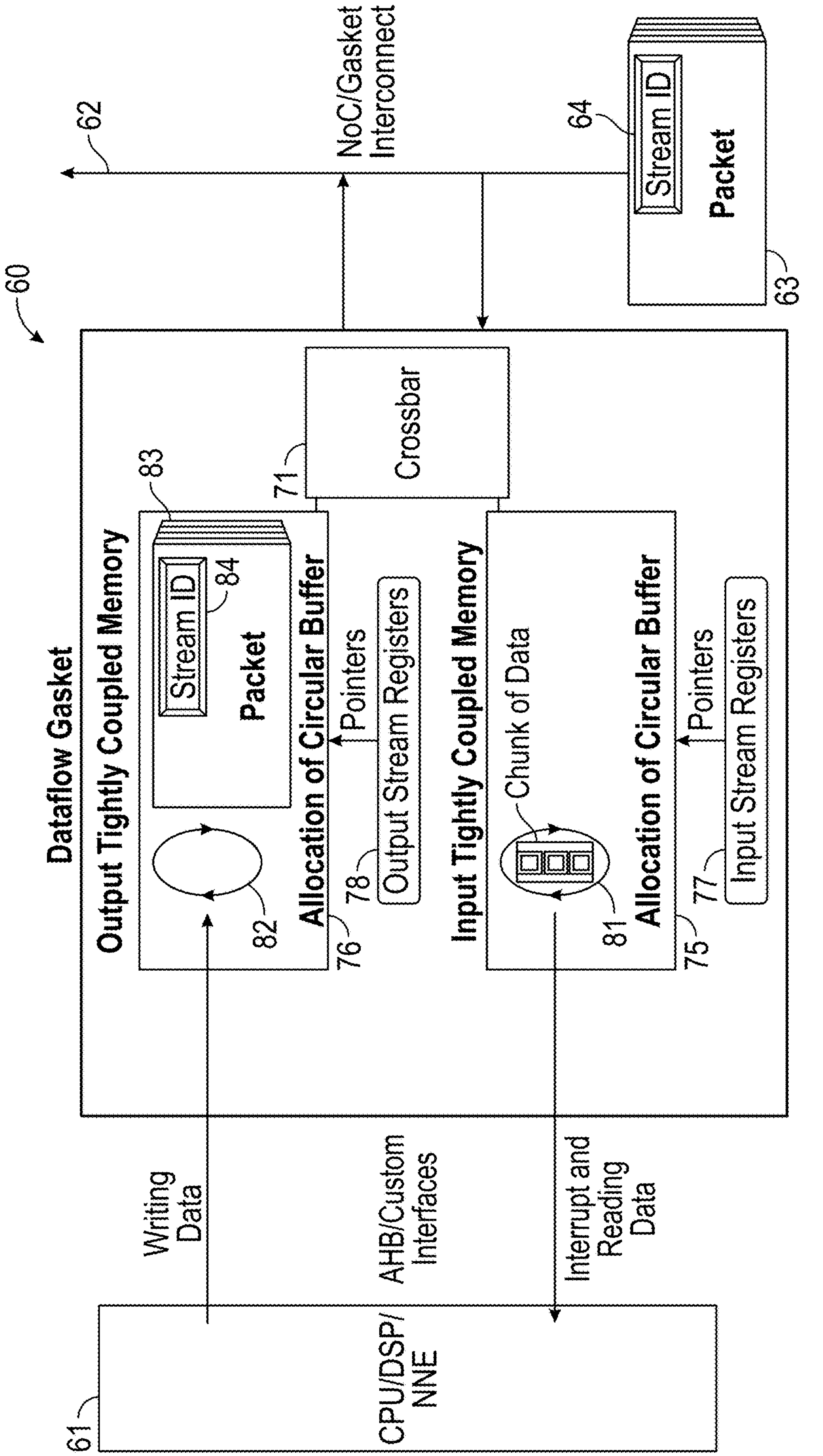
FIG. 3 is a schematic diagram of another embodiment a dataflow gasket.

FIG. 3 is a schematic diagram of another embodiment a dataflow gasket 60. The dataflow gasket 60 is depicted as being coupled to a circuit block 61, which can be, for example, a CPU, DSP, NNE, reconfigurable compute unit, or other IP circuit block such as any of those shown above with reference to FIG. 2B. The dataflow gasket 60 includes a crossbar switch 71, an input memory 75, an output memory 76, input stream registers 77, and output stream registers 78. Although not shown in FIG. 3, the dataflow gasket 60 can include additional functional and control circuitry, which has not been depicted in FIG. 3 for clarity of the figure.

As shown in FIG. 3, the crossbar switch 71 is connected to gasket interconnect 62 that is interconnected with other dataflow gasket(s) as part of an NoC. As shown in FIG. 3, the gasket interconnect 63 is used to send and receive data packets, such as the data packet 63, which has a stream identification (ID) 64.

With continuing reference to FIG. 3, the input memory 75 is tightly coupled to the circuit block 61. Such tight coupling can be achieved in any suitable manner, including, but not limited to, using a custom or non-custom memory interface with a fixed latency read path.

In one example, a two-cycle pipelined bus performs a read operation by broadcasting a read transaction request on a first cycle, and returning data on a second cycle, in which the second cycle can contain another transaction request. The latency is substantially fixed between the read request and the delivery of the data. For instance, an Advanced High-performance Bus (AHB) can operate in this manner to provide tight coupling and enable one transfer per cycle.

As shown in FIG. 3, data received from the gasket interconnect 62 can be provided from the crossbar switch 71 for writing to the input memory 75. Such writing can be facilitated by the use of the input stream registers 77. The input memory 75 includes a circular buffer 81, which is used by the circuit block 61 for reading data from the input memory 75. The circular buffer 81 simplifies memory addressing for the circuit block 61, thereby providing a memory interface between the circuit block 61 and the dataflow gasket 60 that avoids a need for the circuit block 61 to understand the internal memory addressing of the input memory 75. As shown in FIG. 3, the circular buffer 81 also selectively activates an interrupt signal to alert the circuit block 61 as to when new data is available for reading.

In the illustrated embodiment, the output memory 76 is tightly coupled to the circuit block 61, which can write data to the output memory 76. Additionally, the output memory 76 can provide data in the form of data packets (for example, data packet 83 with stream ID 84) to the gasket interconnect 62 by way of the crossbar switch 71. The output of data from the output memory 76 can be facilitated by the use of the output stream registers 78. The output memory 76 includes a circular buffer 82, which is used by the circuit block 62 for writing data to the output memory 76. The circular buffer 82 simplifies memory addressing for the circuit block 61, thereby providing a memory interface between the circuit block 61 and the dataflow gasket 60 that avoids a need for the circuit block 61 to understand the internal memory addressing of the output memory 76.

Figure 4A:
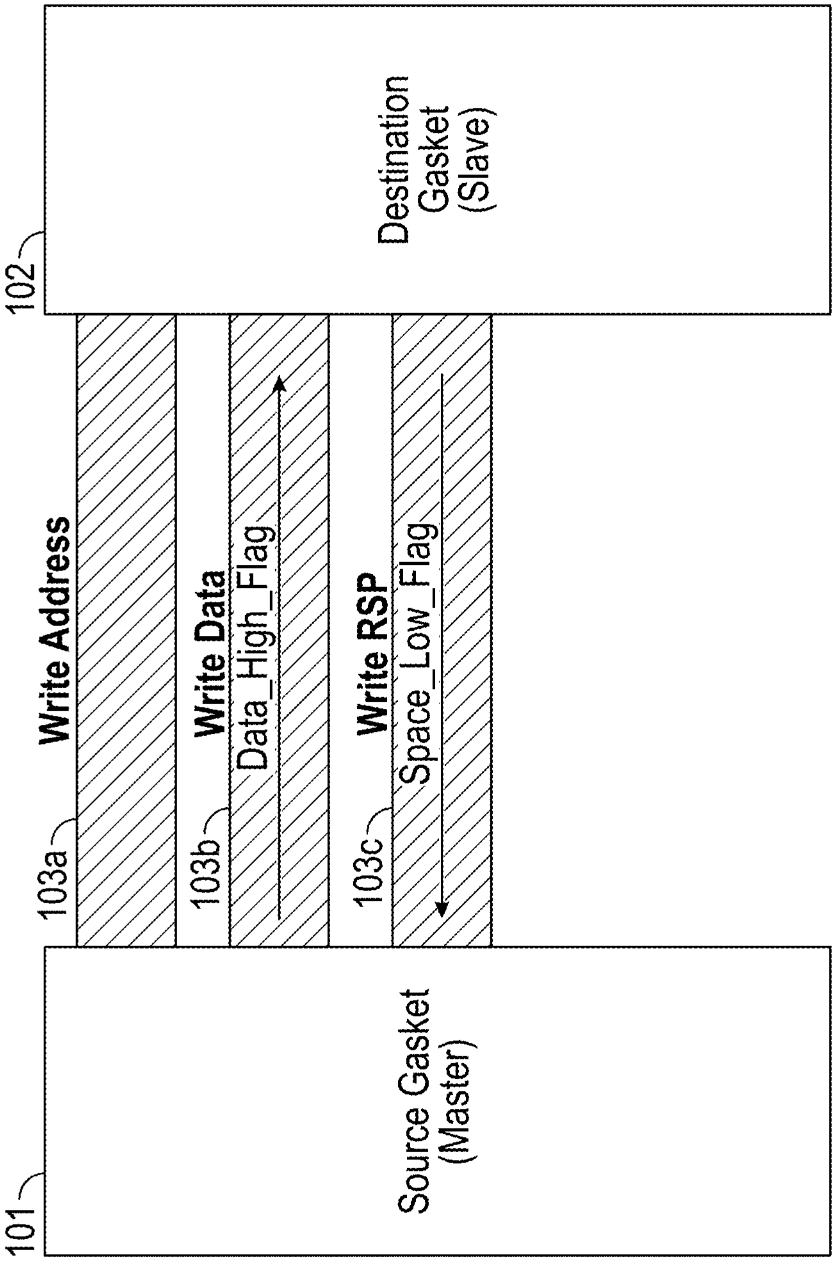
FIG. 4A is a schematic diagram of one embodiment of write channels for a push-pull mechanism between a source gasket and a destination gasket.

FIG. 4A is a schematic diagram of one embodiment of write channels for a push-pull mechanism between a source gasket 101 and a destination gasket 102. As shown in FIG. 4A, the write channels include a write address channel 103*a*, a write data channel 103*b*, and a write response (RSP) channel 103*c*. In this example, the push-pull mechanism is operating in a push mode in which the source gasket 101 serves as master and the destination gasket 102 serves as slave.

For a push-to-pull transition to occur, both a qualifier and a trigger are activated. For example, a data high flag (data_high_flag) serves as a qualifier that is signaled over the write data channel 103*b* from the source gasket 101 to the destination gasket 102, while a low space flag (space_low_flag) serves as a trigger that is signaled over the write RSP channel 103*c* from the destination gasket 102 to the source gasket 101.

Accordingly, the low space flag (space_low_flag) is activated (for example, =1), when the space in a memory (for example, a circular buffer) of the destination gasket (slave) 102 is less than a threshold (for example, the value in a transfer size register such as an AXI transfer size register). Additionally, the data high flag (data_high_flag) is activated (for example, =1) when data available in the source gasket (master) 101 is greater than a threshold (for example, the value in the transfer size register during the last transfer in write). The thresholds for the trigger and qualifier can be the same or different.

In certain implementations, for a push-to-pull transition the destination gasket (slave) 102 uses the write response channel 103*c* to send the "space low flag" when the space in the slave gasket's circular buffer is less than a value in a transfer size register. Additionally, a margin of at least 1 is added such that destination gasket (slave) 102 does not run out of the space altogether. Further, the source gasket (master) 101 sends the "data_high_flag" when data available is greater than the value in the transfer size register during the last transfer in write. Additionally, a margin of at least 1 is added such that the source gasket (master) 101 does not run out of the data altogether.

The push-pull mechanism can be implemented such that the push-to-pull transition happens automatically in both the source gasket 101 and the destination gasket 102 when both the trigger (space_low_flag) and the qualifier (data_high_flag) are signaled.

In certain implementations, the source gasket (master) 101 can delay initiating the next write transaction until the response for the previous transaction is received.

A push-to-pull transition can happen at the destination gasket 102 first and the data source gasket's transition may be delayed due to late arrival of write response carrying the space_low_flag through the network of gaskets. If the destination gasket 102 starts a read transaction, the source gasket 101 can accept the read address and delay the delivery of the data until the write response is received and a transition is made by the source gasket 101 to the pull mode.

In certain implementations, if a push-to-pull transition does not happen due to insufficient data available in the source gasket (master) 101, the source gasket (master) 101 waits until it has sufficient data to assert the data_high_flag. Thereafter, the source gasket (master) 101 can perform a write transaction (for instance, with a transfer size of 1).

When the destination gasket (slave) 102 receives the data and has the "space_low_flag" asserted, the destination gasket (slave) 102 can respond with the space_low_flag still asserted, and the push-to-pull transition happens. However, when the slave gasket's "space_low_flag" is de-asserted, there is no need for the mode transition and the destination gasket (slave) 102 responds with a de-asserted "space_low_flag" and the push-to-pull transition is aborted.

Figure 4B:
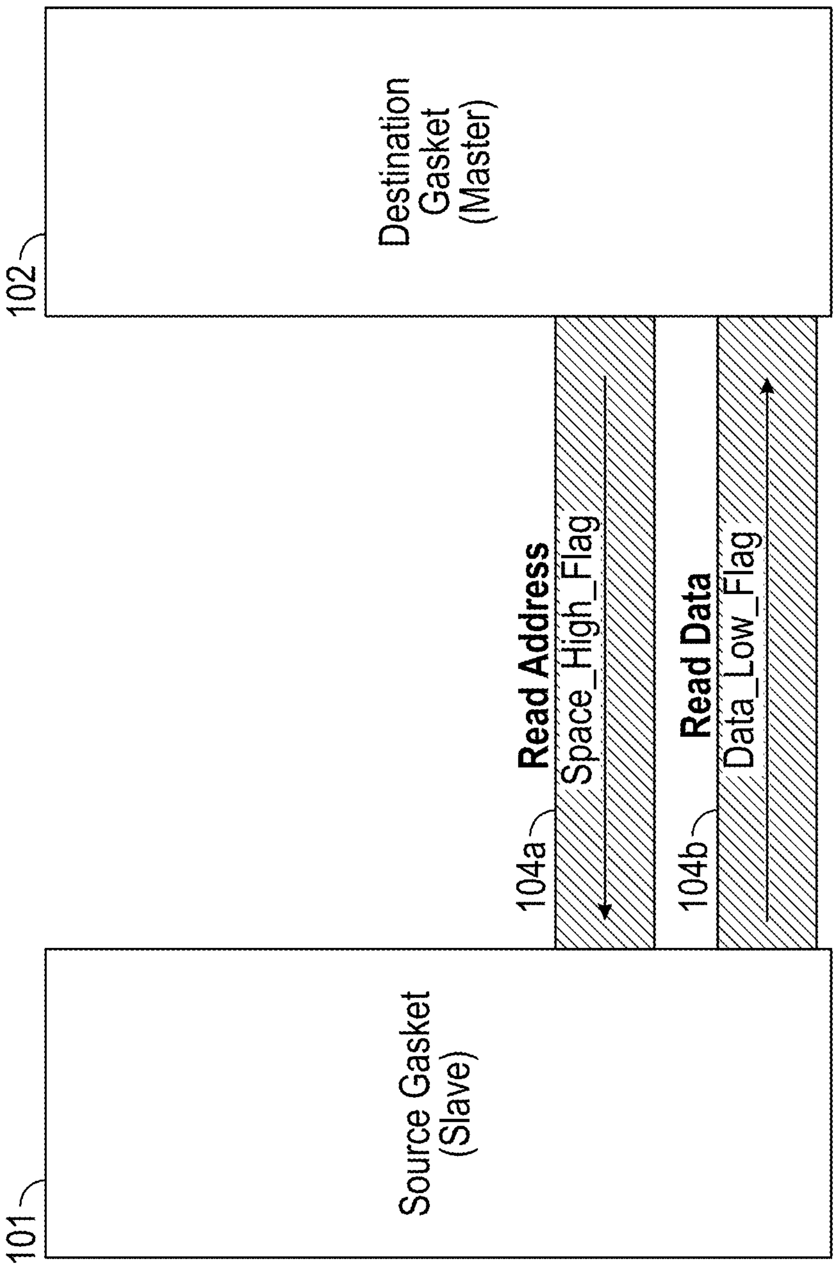
FIG. 4B is a schematic diagram of one embodiment of read channels for a push-pull mechanism between a source gasket and a destination gasket.

FIG. 4B is a schematic diagram of one embodiment read channels for a push-pull mechanism between a source gasket 101 and a destination gasket 102. As shown in FIG. 4B, the read channels include a read address channel 104*a* and a read data channel 104*b*. In this example, the push-pull mechanism is operating in a pull mode in which the source gasket 101 serves as slave and the destination gasket 102 serves as master.

For a pull-to-push transition, both a qualifier and a trigger are activated. For example, a space high flag (space_high_flag) serves as a qualifier is signaled over the read address channel 104*a* from the destination gasket 102 to the source gasket 101, while a low data flag (data_low_flag) serves as a trigger that is signaled over the read data channel 104*b* from the source gasket 101 to the destination gasket 102.

Accordingly, the low data flag (data_low_flag) is activated (for example, =1), when the data in a memory (for example, a circular buffer) of the source gasket (slave) 101 is less than a threshold (for example, the value in a transfer size register such as an AXI transfer size register). Additionally, the space high flag (space_high_flag) is activated (for example, =1) when space available in the destination gasket (master) 102 is greater than a threshold (for instance, twice the value in the transfer size register). In certain implementations, the threshold for the qualifier is greater than the threshold for the trigger.

In certain implementations, for a pull-to-push transition the source gasket (slave) 101 uses the read data channel 104*b* to send the "data_low_flag" when the data in a circular buffer of the source gasket (slave) 101 is less than the value in a transfer size register. Additionally, a margin of at least 1 is added such that the source gasket 101 does not run out of the data altogether. Further, the destination gasket (master) 102 uses the read address channel 104*a* to send the "space_high_flag" when the space available is greater than a factor (for example, twice) the value in the transfer size register. Additionally, a margin of at least 1 is be added such that the destination gasket (master) 102 does not run out of the space altogether.

The pull-to-push transition can be implemented such that the transition occurs automatically in both the source gasket 101 and the destination gasket 102 when both the trigger (data_low_flag) and the qualifier (space_high_flag) are signaled.

In certain implementations, the destination gasket (master) 102 delays initiating the next read transaction until all reads in the previous transaction are completed.

A pull-to-push transition can happen at the source gasket 101 first and the transition at the destination gasket 102 may be delayed due to late arrival of the last read data carrying the data_low_flag through the network. If the source gasket 101 starts a write transaction, the destination gasket 102 can stall the write address or write data until the last read data is received and a transition to push mode is made by the destination gasket 102. However, this will result in a network latency-related stall rather than a memory space-related stall.

When a pull-to-push transition does not happen due to insufficient space available in the destination gasket (master) 102, the destination gasket 102 can wait until the destination gasket 102 has sufficient space to assert the space_high_flag. Thereafter, the destination gasket 102 can perform a read transaction (for instance, with transfer size of 1). When the source gasket (slave) 101 returns the data and the "data_low_flag" is still asserted, the pull-to-push transition occurs. However, when the "data_low_flag" from the source gasket 101 is de-asserted, a need for the pull-to-push transition goes away and the transition is aborted.

In FIGS. 4A and 4B, a transfer size register can be used to define a threshold or watermark to aid in mode transitions. In certain implementations, the transfer size is smaller than the circular buffer size to ensures that there is sufficient space at the destination for the data transfer.

Figure 5A:
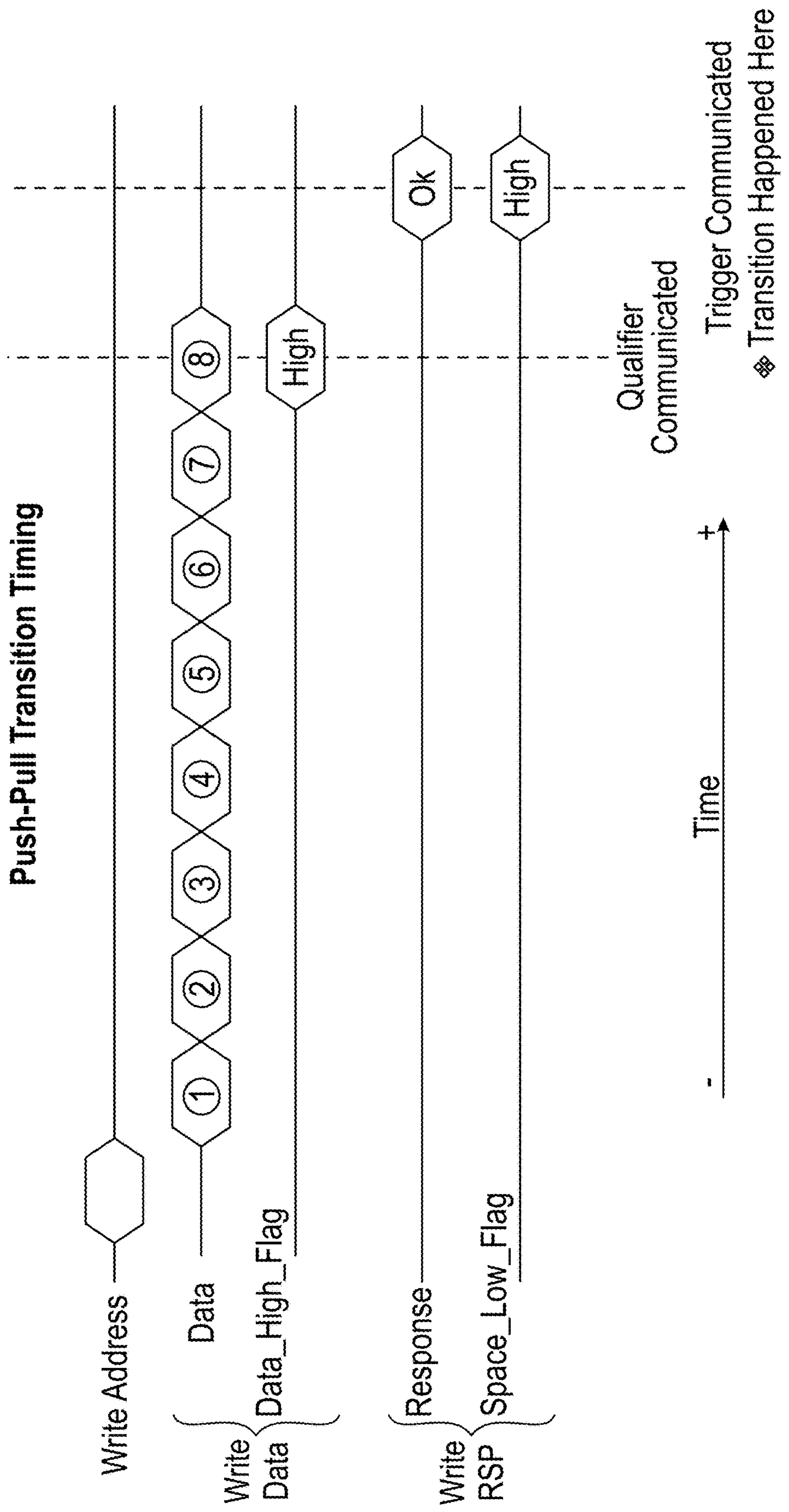
FIG. 5A is a timing diagram for one example of a push-to-pull transition.

FIG. 5A is a timing diagram for one example of a push-to-pull transition. As shown in FIG. 5A, a write transition initially occurs. For the write transaction a write address is provided over a write address channel, and subsequently write data is provided over a write data channel.

As shown in FIG. 5A, the source gasket (master) uses the write data channel to activate the qualifier ("data_high_flag") when data available is greater than a threshold (for example, the value in the transfer size register during the last transfer in write).

Further, the destination gasket (slave) uses the write response channel to activate the "space_low_flag" when the space in a memory (for example, circular buffer) of the destination gasket is less than a threshold (for example, the value in the transfer size register).

Figure 5B:
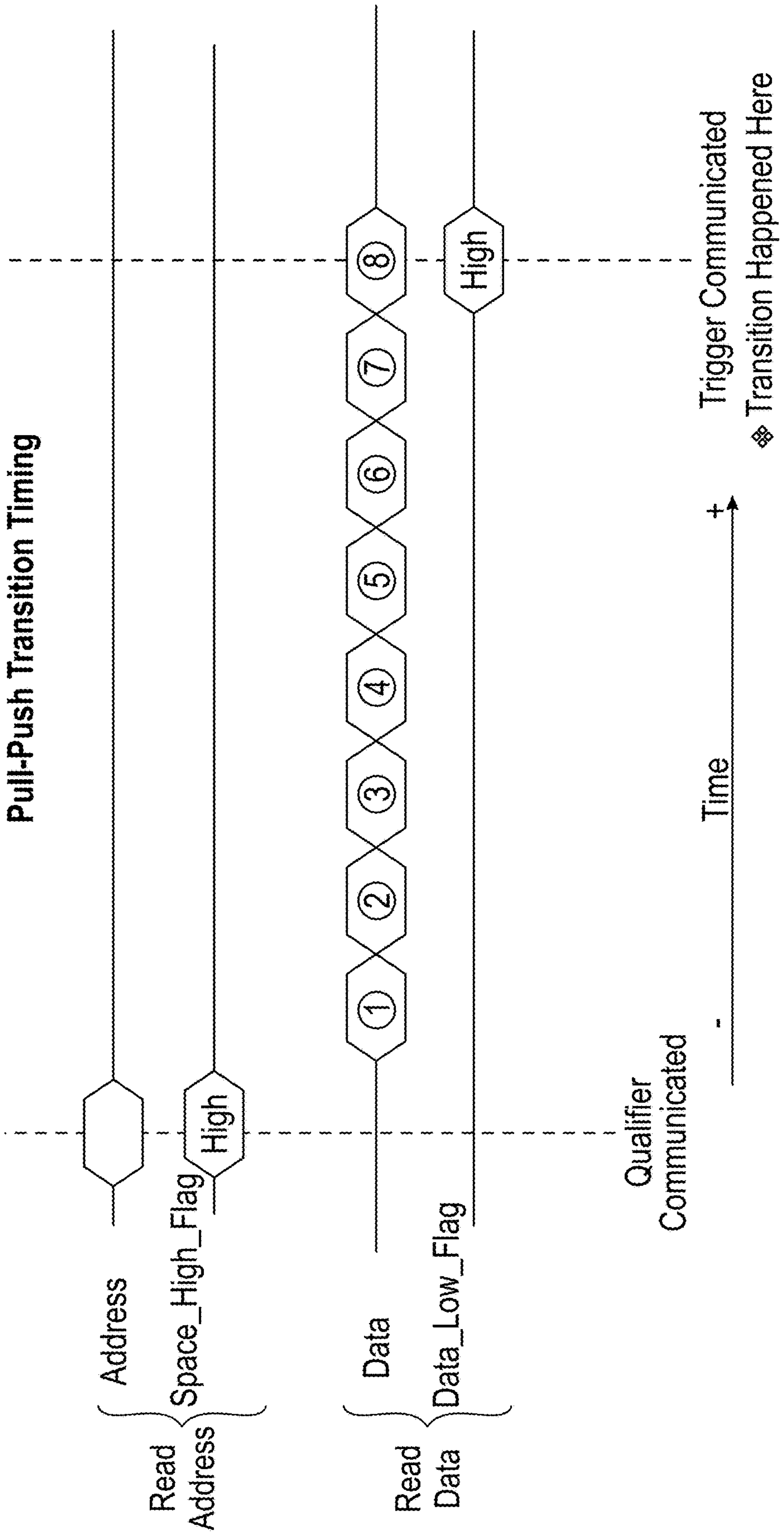
FIG. 5B is a timing diagram for one example of a pull-to-push transition.

FIG. 5B is a timing diagram for one example of a pull-to-push transition. As shown in FIG. 5B, the destination gasket (master) uses a read address channel to activate a qualifier ("space_high_flag") when the space available in the destination gasket (master) is greater than a threshold (for example, twice the value in the transfer size register).

After the qualifier is activated, the source gasket (slave) uses the read data channel to read a series of data, and thereafter to activate a trigger ("data_low_flag") when the data in a memory (for example, circular buffer) of the source gasket is less than a threshold (for example, the value in the transfer size register).

Figure 6A:
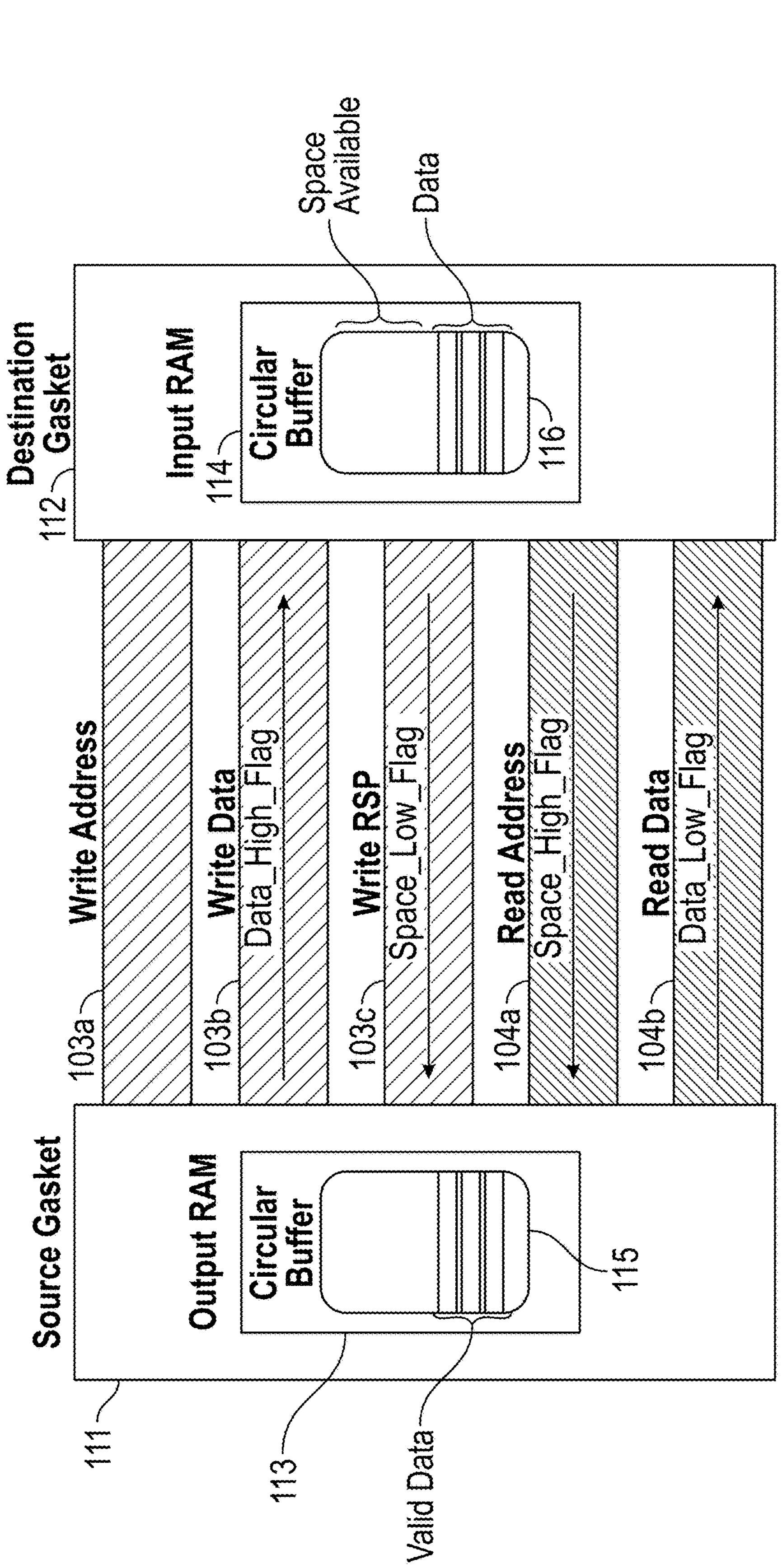
FIG. 6A is another embodiment of a push-pull mechanism between a source gasket and a destination gasket.

FIG. 6A is another embodiment of a push-pull mechanism between a source gasket 111 and a destination gasket 112. As shown in FIG. 6A, the source gasket 111 includes an output memory 113 including a source circular buffer 115 holding valid data. Additionally, the destination gasket 112 includes an input memory 114 including a destination circular buffer 116 holding data and having space available.

The source gasket 111 and the destination gasket 112 are connected by a push-pull interface including a write address channel 103*a*, a write data channel 103*b*, a write response channel 103*c*, a read address channel 104*a*, and a read data channel 104*b*.

The write data channel 103*b* is used by the source gasket 111 to send a data_high_flag, which is activated when the data available in the source circular buffer 115 is greater than a first threshold (with margin). Additionally, the write response channel 103*c* is used by the destination gasket 112 to send a space_low_flag, which is activated when the space available in the destination circular buffer 116 is less than or equal to the first threshold (with margin). Furthermore, the read address channel 104*a* is used by the destination gasket 112 to send a space_high_flag, which is activated when the space available in the destination circular buffer 116 is greater than a second threshold (corresponding to twice the first threshold with margin, in this example). Additionally, the read data channel 104*b* is used by the source gasket 111 to send a data_low_flag, which is activated when the data available in the source circular buffer 115 is less than or equal to the first threshold (with margin).

Figure 6B:
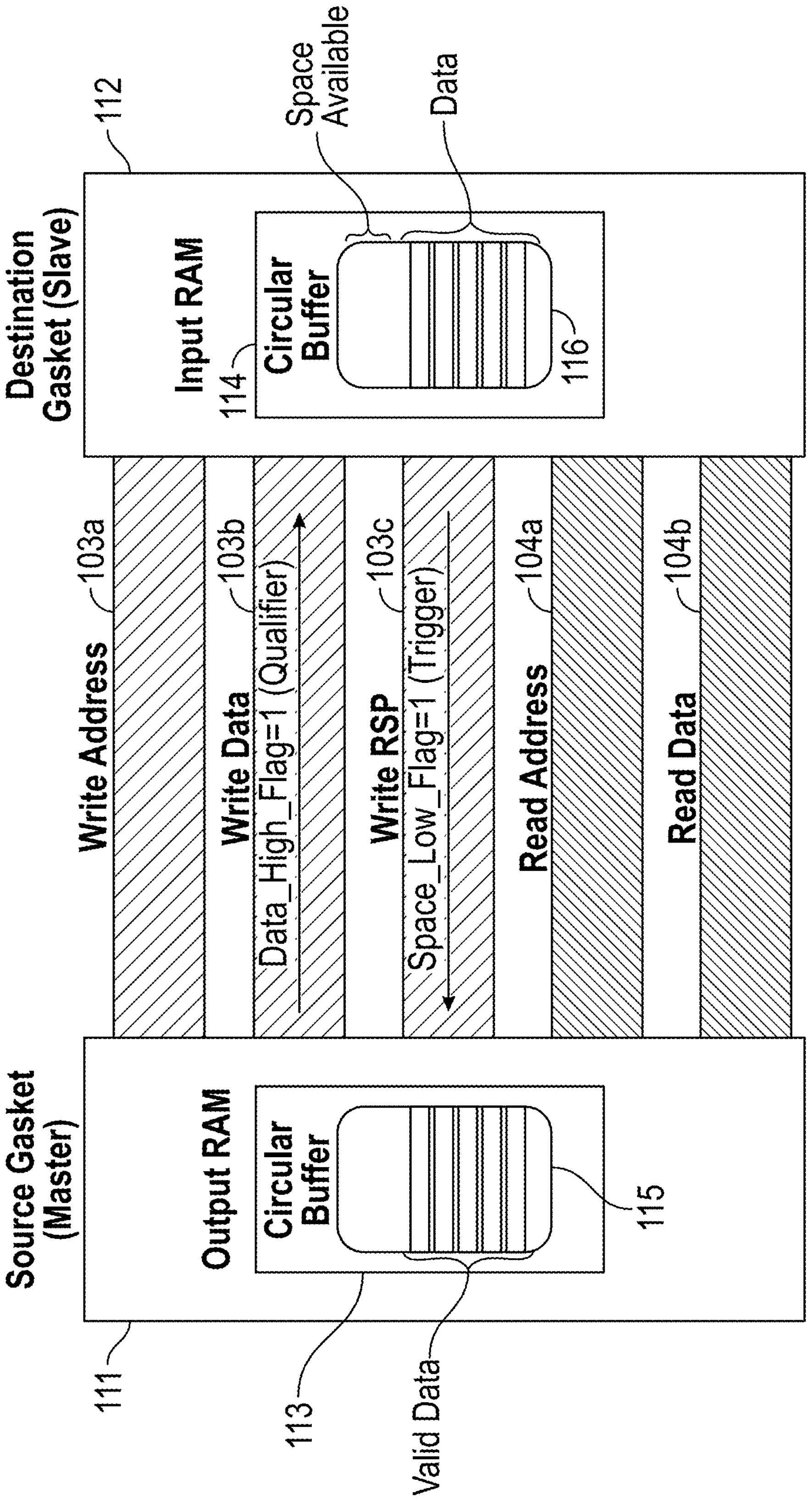
FIG. 6B depicts one example of a successful push-to-pull transition for the push-pull mechanism of FIG. 6A.

FIG. 6B depicts one example of a successful push-to-pull transition for the push-pull mechanism of FIG. 6A.

In FIG. 6B, the source gasket 111 and the destination gasket 112 start in a push mode in which the source gasket 111 serves as master and the destination gasket 112 serves as slave. Thereafter, both the qualifier (data_high_flag) and the trigger (space_low_flag) are activated, and thus a successful push-to-pull transition occurs. After the transition, the source gasket 111 and the destination gasket 112 are in a pull mode in which the source gasket 111 serves as slave and the destination gasket 112 serves as master.

Figure 6C:
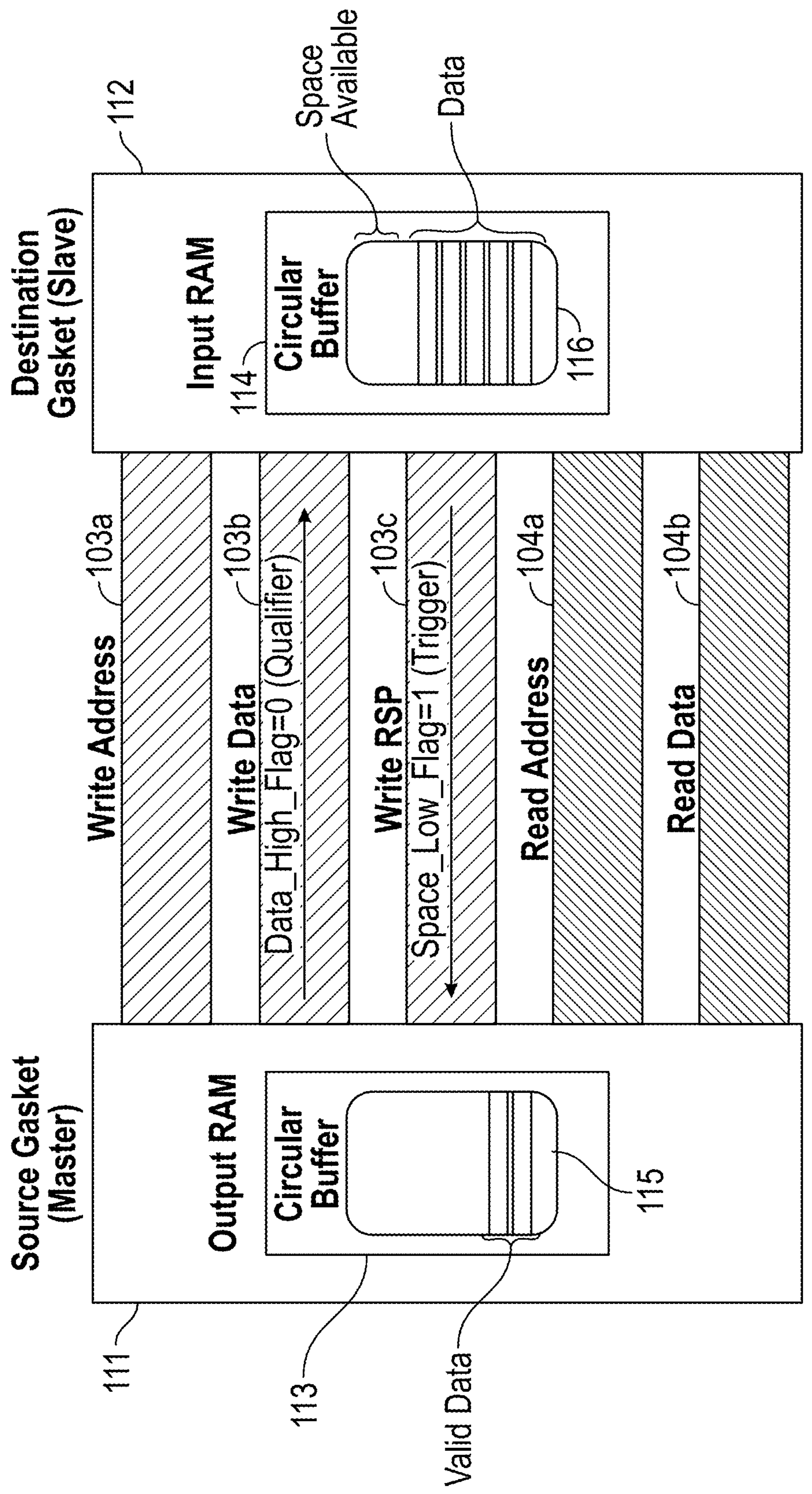
FIG. 6C depicts one example of an unsuccessful push-to-pull transition for the push-pull mechanism of FIG. 6A.

FIG. 6C depicts one example of an unsuccessful push-to-pull transition for the push-pull mechanism of FIG. 6A.

In FIG. 6C, the source gasket 111 and the destination gasket 112 start in a push mode in which the source gasket 111 serves as master and the destination gasket 112 serves as slave. Thereafter, the trigger (space_low_flag) is activated, but the qualifier (data_high_flag) remains de-activated. Thus, the push-to-pull transition is unsuccessful, and the source gasket 111 and the destination gasket 112 remain in the push mode.

In such an operating scenario, the system can wait for the data_high_flag to become activated. In certain implementations, a data write transaction is performed to communicate the status and re-evaluate.

Figure 6D:
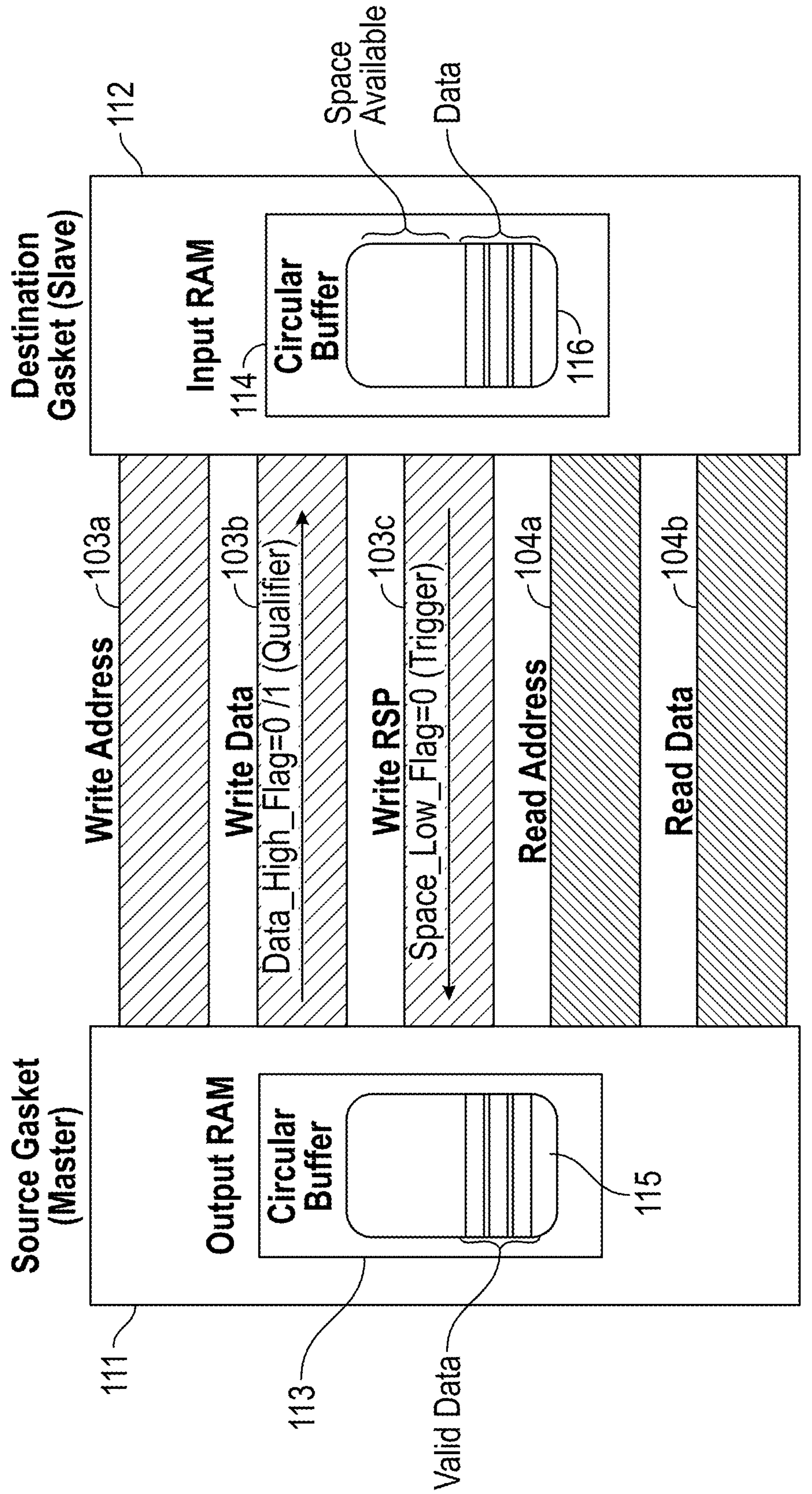
FIG. 6D depicts one example of an unneeded push-to-pull transition for the push-pull mechanism of FIG. 6A.

FIG. 6D depicts one example of an unneeded push-to-pull transition for the push-pull mechanism of FIG. 6A.

In FIG. 6D, the source gasket 111 and the destination gasket 112 start in a push mode in which the source gasket 111 serves as master and the destination gasket 112 serves as slave. Additionally, the trigger (space_low_flag) is de-activated, and thus a push-to-pull transition is not needed regardless of whether the qualifier (data_high_flag) is activated or de-activated.

Figure 6E:
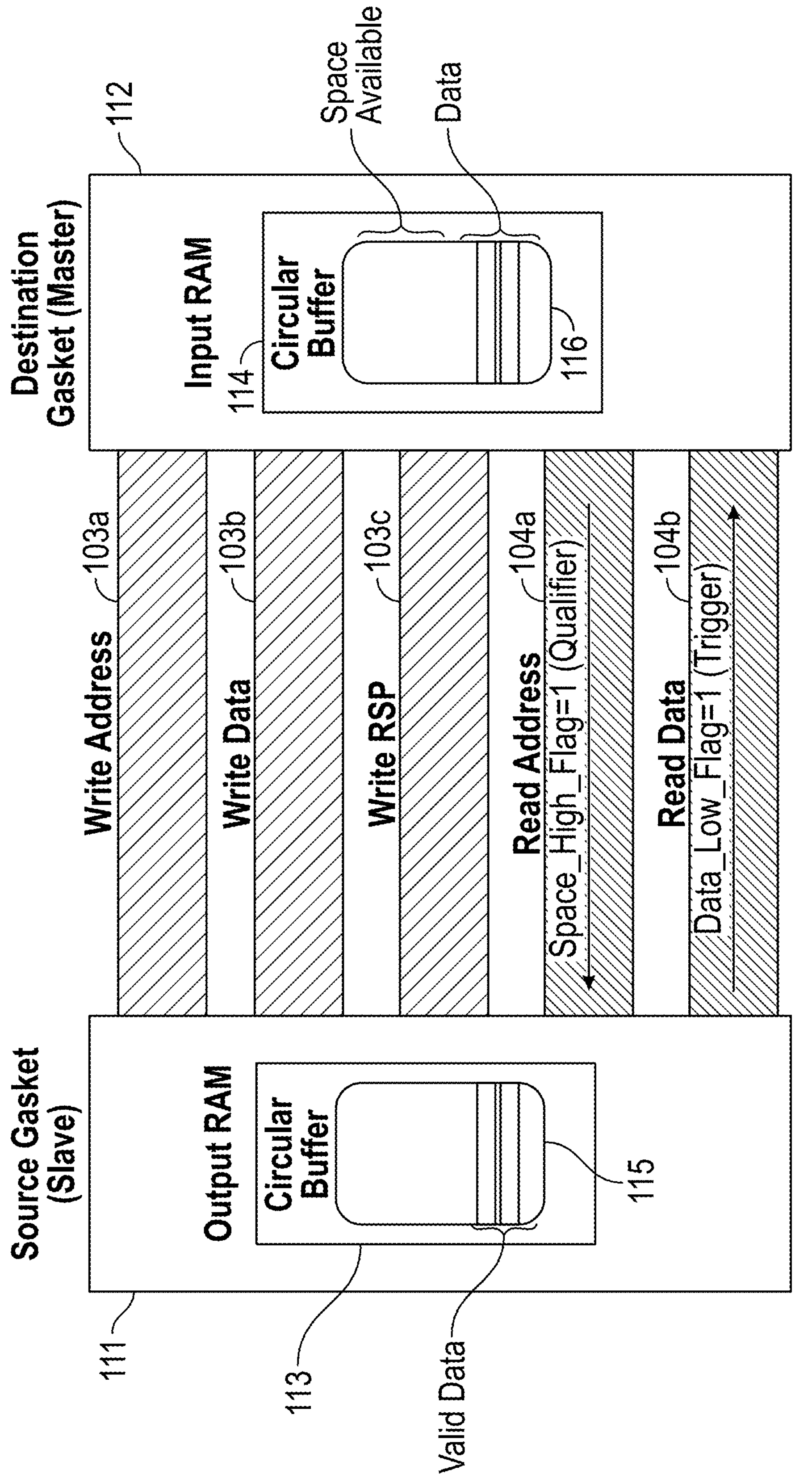
FIG. 6E depicts one example of a successful pull-to-push transition for the push-pull mechanism of FIG. 6A.

FIG. 6E depicts one example of a successful pull-to-push transition for the push-pull mechanism of FIG. 6A.

In FIG. 6E, the source gasket 111 and the destination gasket 112 start in a pull mode in which the destination gasket 112 serves as master and the source gasket 111 serves as slave. Thereafter, both the qualifier (space_high_flag) and the trigger (data_low_flag) are activated, and thus a successful pull-to-push transition occurs. After the transition, the source gasket 111 and the destination gasket 112 are in a push mode in which the source gasket 111 serves as master and the destination gasket 112 serves as slave.

Figure 6F:
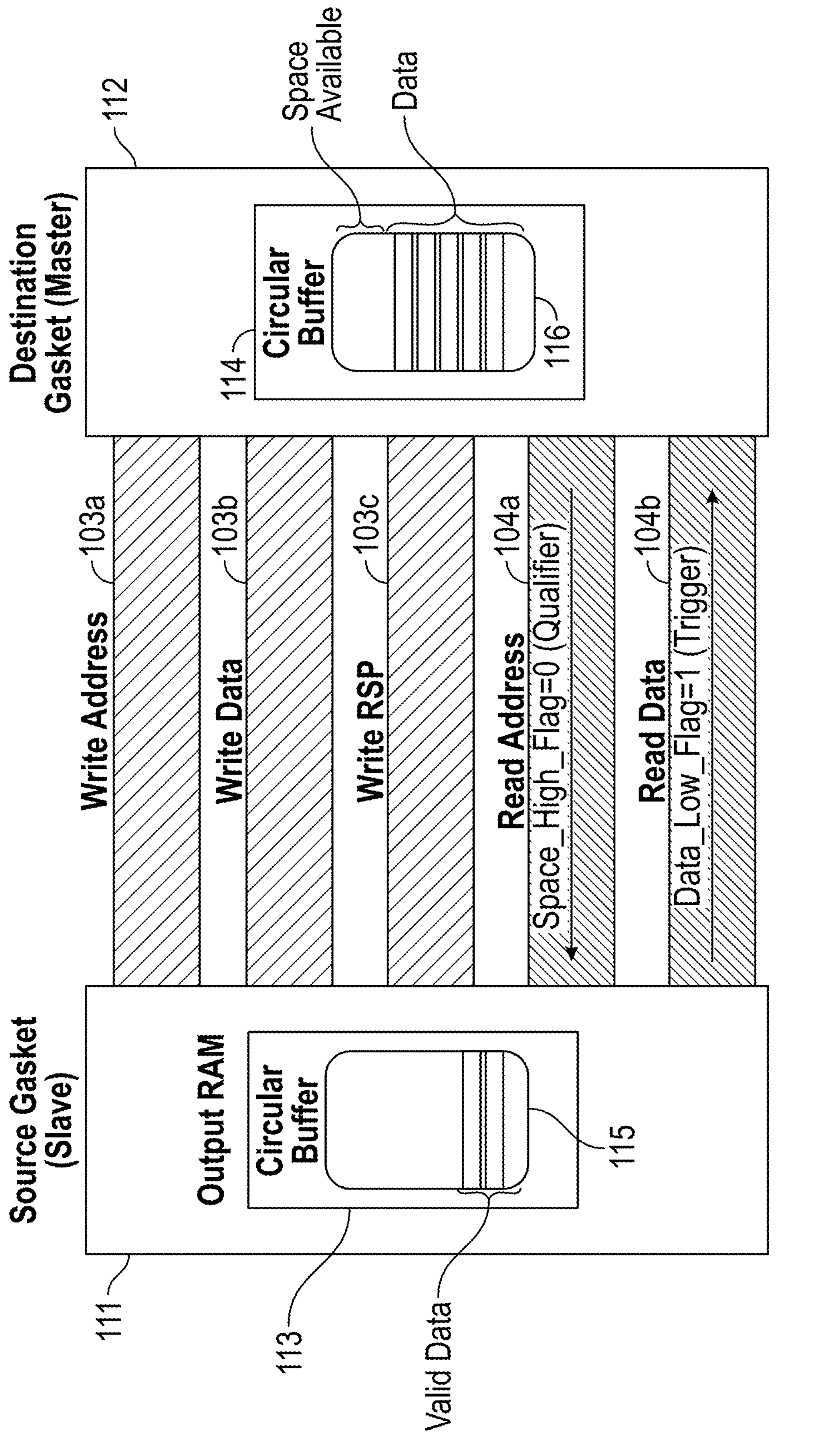
FIG. 6F depicts one example of an unsuccessful pull-to-push transition for the push-pull mechanism of FIG. 6A.

FIG. 6F depicts one example of an unsuccessful pull-to-push transition for the push-pull mechanism of FIG. 6A.

In FIG. 6F, the source gasket 111 and the destination gasket 112 start in a pull mode in which the source gasket 111 serves as slave and the destination gasket 112 serves as master. Thereafter, the trigger (data_low_flag) is activated, but the qualifier (space_high_flag) remains de-activated.

Thus, the pull-to-push transition is unsuccessful, and the source gasket 111 and the destination gasket 112 remain in the pull mode.

In such an operating scenario, the system can wait for the space_high_flag to become activated. In certain implementations, a data read transaction can be performed to communicate the status and re-evaluate.

Figure 6G:
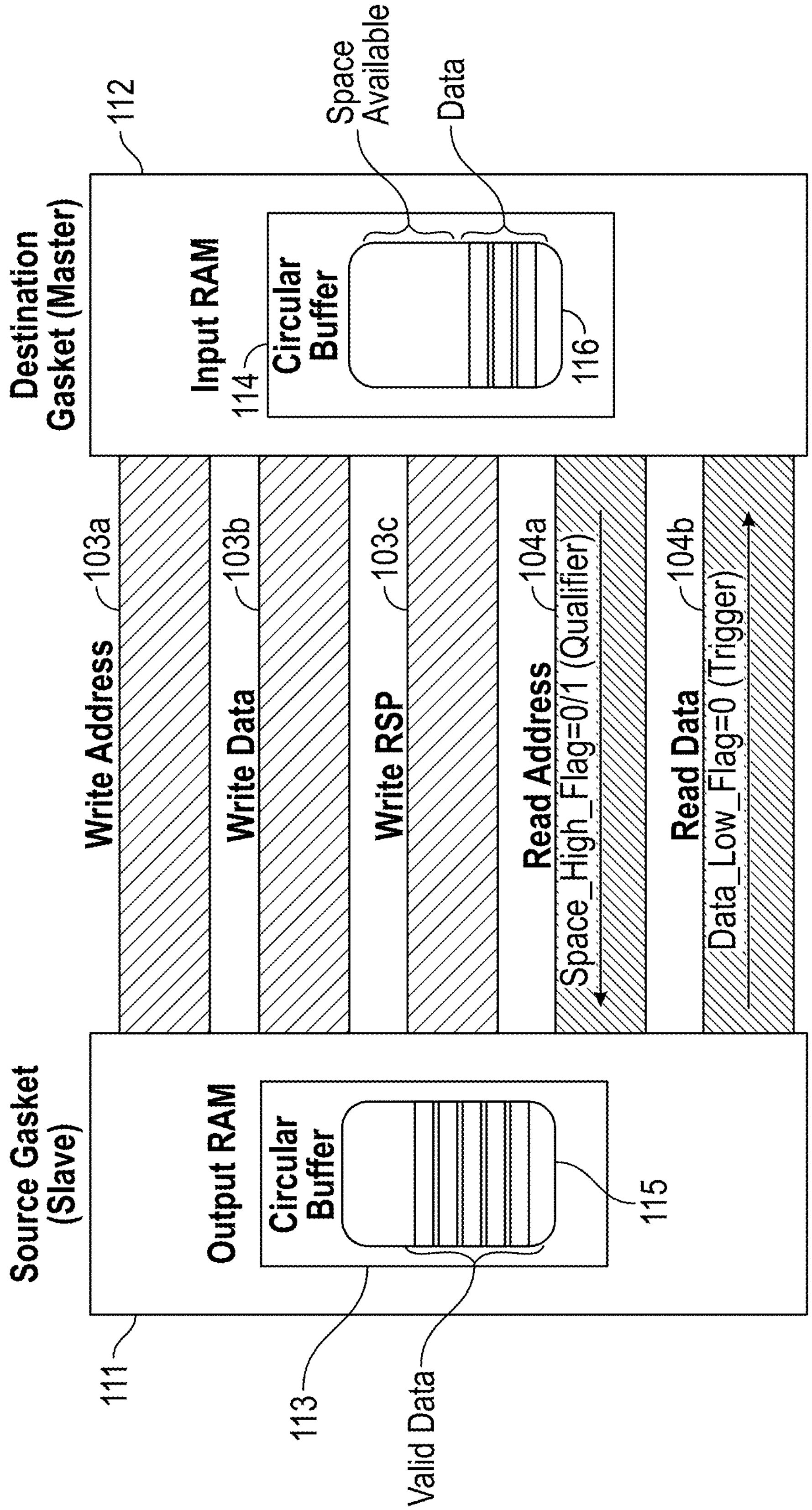
FIG. 6G depicts one example of an unneeded pull-to-push transition for the push-pull mechanism of FIG. 6A.

FIG. 6G depicts one example of an unneeded pull-to-push transition for the push-pull mechanism of FIG. 6A.

In FIG. 6G, the source gasket 111 and the destination gasket 112 start in a pull mode in which the source gasket 111 serves as slave and the destination gasket 112 serves as master. Additionally, the trigger (data_low_flag) is de-activated, and thus a push-to-pull transition is not needed regardless of whether the qualifier (space_high_flag) is activated or de-activated.

Figure 7:
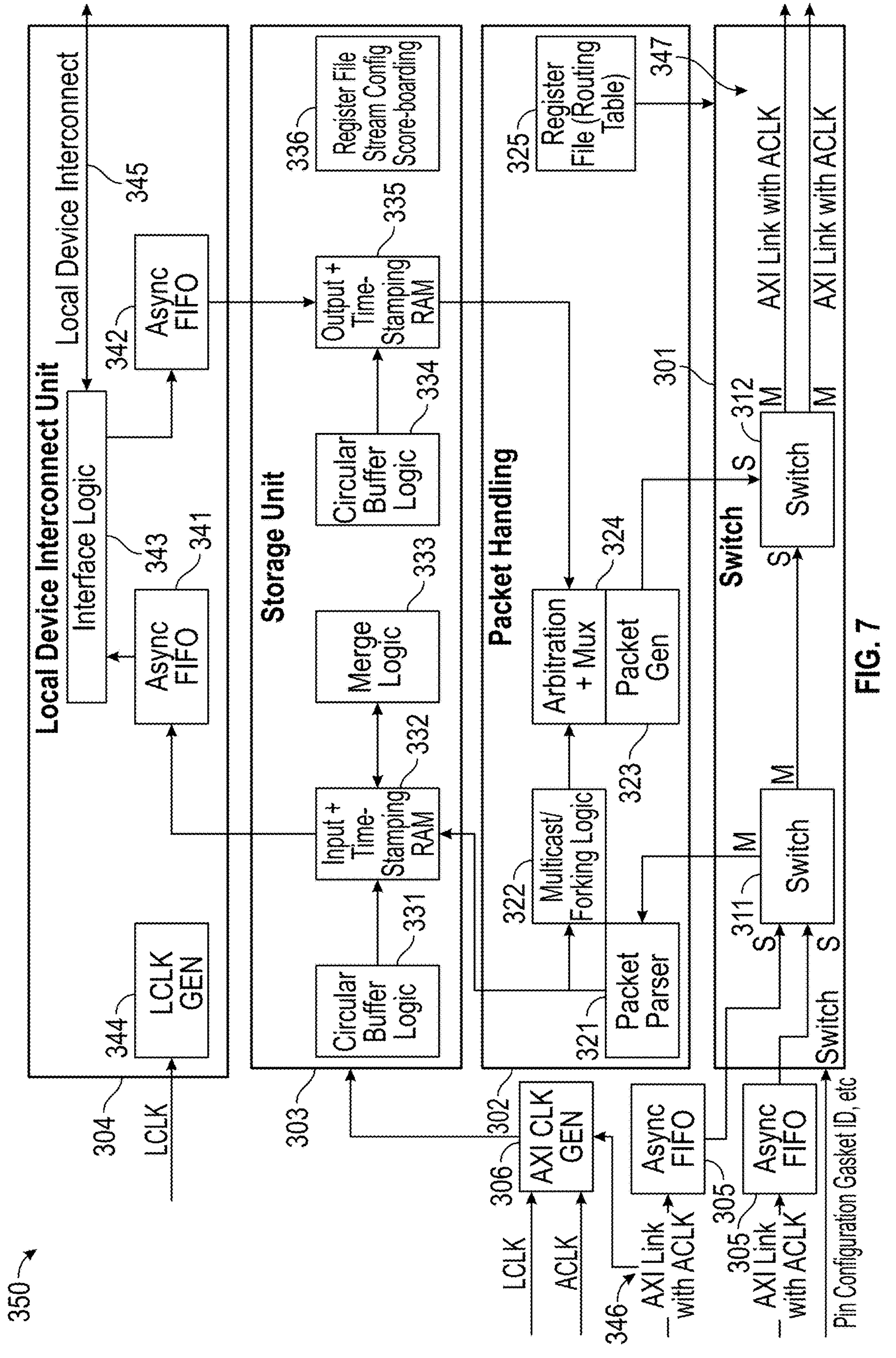
FIG. 7 is a schematic diagram of another embodiment of a dataflow gasket.

FIG. 7 is a schematic diagram of another embodiment of a dataflow gasket 350. The dataflow gasket 350 includes a crossbar switch 301, a packing handling circuit 302, a memory circuit 303 (also referred to as a storage unit), a local device interconnect circuit 304, asynchronous first-in first-out (FIFO) circuitry 305, and a clock generation circuit 306. The dataflow gasket 350 connects to an IP circuit block by way of local device interconnect 345 and connects to gasket interconnect/NoC by way of input ports 346 and output ports 347.

In the illustrated embodiment, the crossbar switch 311 includes an input-side switch 311 and an output-side switch 312. Additionally, the packet handling circuit 302 includes a packet parser 321, multicast/forking logic 322, a packet generation circuit 323, an arbitration and muxing circuit 324, and a register file 324 providing a routing table. Furthermore, the memory circuit 303 includes input circular buffer logic 331, input and time-stamping RAM 332, merge logic 333, output circular buffer logic 334, output and time-stamping RAM 335, and a register file 336 providing stream configuration and score boarding. Additionally, the local device interconnect unit 304 includes a local clock generation circuit 344, an input asynchronous FIFO 341, an output asynchronous FIFO 342, and interface logic 343.

With continuing reference to FIG. 7, the data path of the dataflow gasket 350 generally includes two major sub-blocks including a routing unit and a stream unit. The routing unit can be sub-divided into the packing handling circuit 302 and the crossbar switch 301. Additionally, the stream unit can be subdivided into the storage unit 303 and the local device interconnect unit 304.

The crossbar switch 301 connects to the crossbar switches of other dataflow gaskets by way of gasket interconnect/NoC. In the illustrated embodiment, the dataflow gasket 350 communicates with other dataflow gaskets by way of a multi-cycle bus, which can have unfixed latency in some implementations.

In one example, the multi-cycle bus can correspond to an N-cycle bus that can perform component transactions (read address, write address, read data, write data, and write acknowledge) with arbitrary pipelining. An N-cycle bus allows one transfer per cycle but operates with latency that is not fixed. For instance, an Advanced Extensible Interface (AXI) can operate in this manner.

In another example, a two cycle un-pipelined bus performs a read operation by broadcasting a read transaction request on a first cycle and returning data on a second cycle, in which the second cycle does not contain another transaction request. For instance, an Advanced Peripheral Bus (APB) can operate in this manner. Although various examples of bus architectures for gasket interconnect are provided, other implementations are possible.

As shown in FIG. 7, the dataflow gasket 350 includes various register files. Such register files can be used to store routing unit information such as gasket ID and routing table. Additionally, the register files can include output stream configuration registers for running a desired number of output streams, and input stream configuration registers for running a desired number of input streams. Furthermore, the register files can include configuration registers used for enabling or disabling gasket features, such as those related to buffer allocation.

The input-side switch 311 serves to route incoming data through to the output-side switch 312 and/or to the storage unit 303. The input-side switch 311 can provide a stream ID to the packet parser 321, which can determine whether or not a particular received data packet is intended for the dataflow gasket 350. The output-side switch 312 can provide data coming through from the input-side switch 311 or data from the packet generation circuit 323 to the output ports 347.

With continuing reference to FIG. 7, the multicast/forking logic 322 can work in combination with the arbitration/multiplexing circuit 324 to facilitate broadcast of a packet to multiple dataflow gaskets. For example, a source dataflow gasket can send a list of all receiving dataflow gaskets as part of a packet. Once received at a given dataflow gasket, the dataflow gasket can send a list of all recipients of the stream as part of the packet and remove its own ID from the header.

The input and timing stamping RAM 332 serves to store incoming data. In this example, timestamp access for a FIFO mode is provided. Such a FIFO mode can increment a write pointer for writes and a read pointer for reads. The pointers correspond to addresses to the RAM's and point to a particular location inside the circular buffer of a stream. Thus, working in combination with the circular buffer logic 331, the input and timing stamping RAM 332 implements a circular buffer.

In the illustrated embodiment, merge logic 333 is included to facilitate a merge of data streams from multiple sources.

The output and timing stamping RAM 335 serves to store outgoing data. Working in combination with the circular buffer logic 334, the output and timing stamping RAM 335 implements a circular buffer.

The storage unit 303 can operate with a first clock signal from the AXI clock generation circuit 306, while the local device interconnect unit 304 can operate with a second clock signal from the local clock generation circuit 344. The first and second clock signals can be asynchronous.

Accordingly, the input asynchronous FIFO 341 and the output asynchronous FIFO 342 are included and controlled by the interface logic 343. The asynchronous FIFOs 341/342 aid in communicating data between the storage unit 303 and an IP circuit block coupled to the dataflow gasket 350 by way of the local device interconnect 345.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

While certain embodiments have been described, these embodiments have been presented by way of example only and are not intended to limit the scope of the disclosure. Indeed, the novel apparatus, methods, and systems described herein may be embodied in a variety of other forms; furthermore, various omissions, substitutions and changes in the form of the methods and systems described herein may be made without departing from the spirit of the disclosure. For example, while the disclosed embodiments are presented in a given arrangement, alternative embodiments may perform similar functionalities with different components and/or circuit topologies, and some elements may be deleted, moved, added, subdivided, combined, and/or modified. Each of these elements may be implemented in a variety of different ways. Any suitable combination of the elements and acts of the various embodiments described above can be combined to provide further embodiments.

What is claimed is:

1. An integrated circuit (IC) comprising:
- a plurality of circuit blocks including a first circuit block and a second circuit block; and
- a plurality of dataflow gaskets configured to transmit data, the plurality of dataflow gaskets electrically connected by a network of gasket interconnect, the plurality of dataflow gaskets comprising a source gasket comprising an output memory coupled to the first circuit block, and a destination gasket comprising an input memory coupled to the second circuit block,
- wherein the source gasket is configured to communicate with the destination gasket over the network using a push mode and a pull mode, wherein in the push mode and the pull mode the data is transmitted between the source gasket and the destination gasket,
- wherein a transition from the pull mode to the push mode occurs in response to a data low trigger signal activated by the source gasket and a space high qualifier signal activated by the destination gasket, and
- wherein a transition from the push mode to the pull mode occurs in response to a space low trigger signal activated by the destination gasket and a data high qualifier signal activated by the source gasket.

2. The IC of claim 1, wherein the data low trigger signal is activated when available data in the output memory of the source gasket is less than a data low threshold.

3. The IC of claim 2, wherein the space high qualifier signal is activated when available space in the input memory of the destination gasket is greater than a space high threshold.

4. The IC of claim 3, wherein the space low trigger signal is activated when the available space in the input memory of the destination gasket is less than a space low threshold.

5. The IC of claim 4, wherein the data high qualifier signal is activated when the available data in the output memory of the source gasket is greater than a data high threshold.

6. The IC of claim 3, wherein the space high threshold is twice the data low threshold.

7. The IC of claim 1, wherein the network connecting the source gasket to the destination gasket includes a read address channel and a read data channel, wherein the data low trigger signal is communicated over the read data channel and the space high qualifier signal is communicated over the read address channel.

8. The IC of claim 7, wherein the network connecting the source gasket to the destination gasket further includes a write address channel, a write data channel, and a write response channel, wherein the space low trigger signal is communicated over the write response channel and the data high qualifier signal is communicated over the write data channel.

9. The IC of claim 1, wherein in the push mode the source gasket serves as a master and the destination gasket serves as a slave, and in the pull mode the source gasket serves as the slave and the destination gasket serves as the master.

10. The IC of claim 1, wherein in the push mode write data flows over a data write channel of the network from the output memory of the source gasket to the input memory of the destination gasket.

11. The IC of claim 1, wherein in the pull mode read data flows through the network over a data read channel from the output memory of the source gasket to the input memory of the destination gasket.

12. The IC of claim 1, wherein the output memory of the source gasket is a first circular buffer, and the input memory of the destination gasket is a second circular buffer.

13. The IC of claim 1, wherein the first circuit block comprises a digital signal processor, a central processing unit, a neural processing unit, a reconfigurable compute unit, or an analog-to-digital converter (ADC).

14. The IC of claim 13, wherein the second circuit block comprises a digital signal processor, a central processing unit, a neural processing unit, a reconfigurable compute unit, or a digital-to-analog converter (DAC).

15. A method of handling dataflow between circuit blocks, the method comprising:
- communicating between a source gasket and a destination gasket over a network using a push mode and a pull mode, the source gasket comprising an output memory coupled to a first circuit block and the destination gasket comprising an input memory coupled to a second circuit block, wherein in the push mode and the pull mode data is transmitted between the source gasket and the destination gasket;
- providing a transition from the pull mode to the push mode in response to a data low trigger signal activated by the source gasket and a space high qualifier signal activated by the destination gasket, and
- providing a transition from the push mode to the pull mode in response to a space low trigger signal activated by the destination gasket and a data high qualifier signal activated by the source gasket.

16. The method of claim 15, wherein the data low trigger signal is activated when available data in the output memory of the source gasket is less than a data low threshold.

17. The method of claim 16, wherein the space high qualifier signal is activated when available space in the input memory of the destination gasket is greater than a space high threshold.

18. The method of claim 17, wherein the space low trigger signal is activated when the available space in the input memory of the destination gasket is less than a space low threshold.

19. The method of claim 18, wherein the data high qualifier signal is activated when the available data in the output memory of the source gasket is greater than a data high threshold.

20. The method of claim 15, wherein the network connecting the source gasket to the destination gasket includes a read address channel, a read data channel, a write address channel, a write data channel, and a write response channel, wherein the data low trigger signal is communicated over the read data channel and the space high qualifier signal is communicated over the read address channel, and the space low trigger signal is communicated over the write response channel and the data high qualifier signal is communicated over the write data channel.

* * * * *